Feb. 7, 1961
M. R. CINES
2,970,991
POLYOLEFIN DRYING PROCESS
Filed Oct. 11, 1956
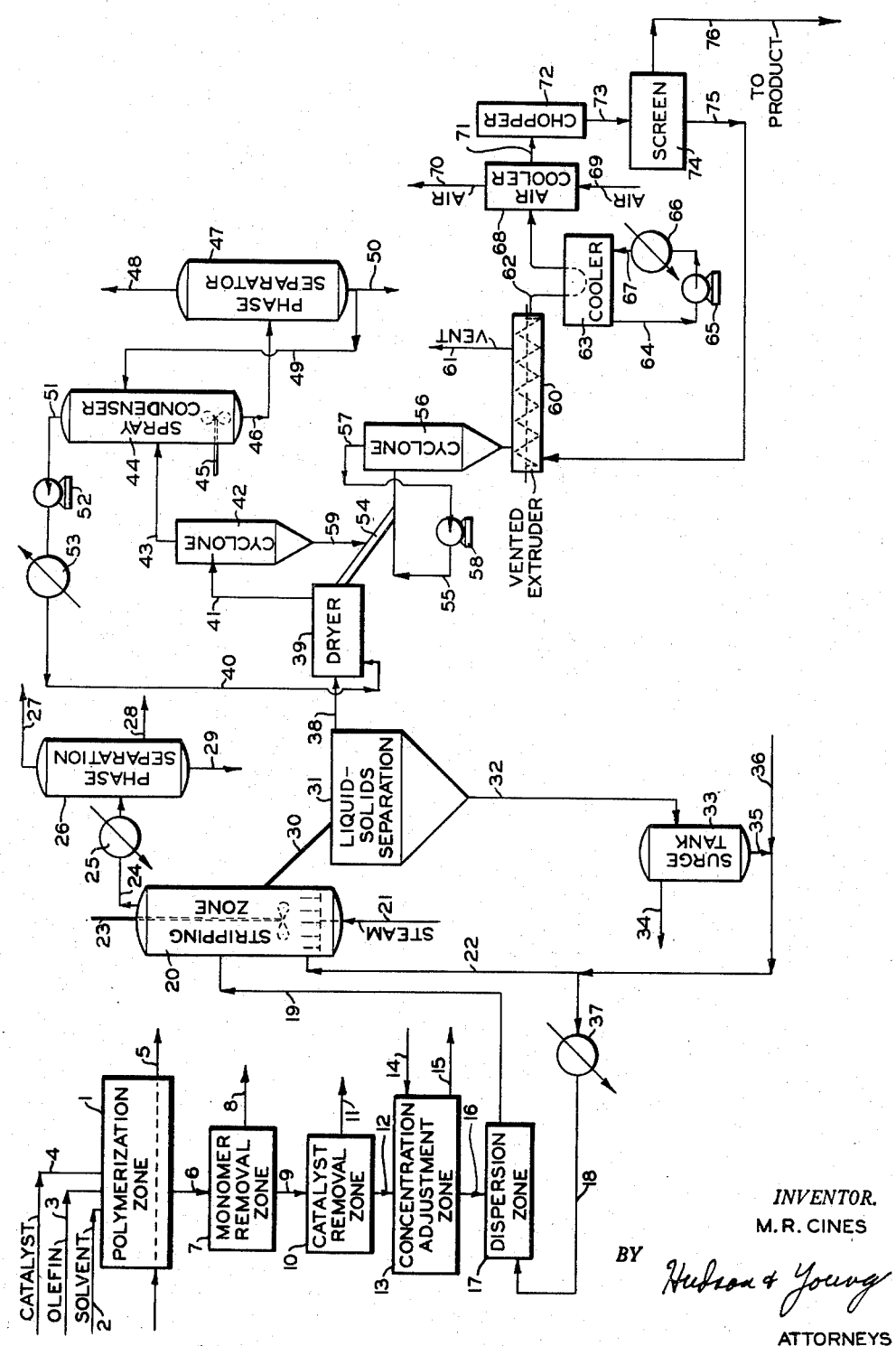
INVENTOR.
M. R. CINES
BY
Hudson & Young
ATTORNEYS

# United States Patent Office 2,970,991
Patented Feb. 7, 1961

2,970,991
POLYOLEFIN DRYING PROCESS

Martin R. Cines, Bartlesville, Okla., assignor to Phillips Petroleum Company, a corporation of Delaware Filed Oct. 11, 1956, Ser. No. 615,353

6 Claims. (Cl. 260—94.9)

This invention relates to a novel process for drying olefin polymers.

The method of this invention is applicable to drying of olefin polymers broadly. It has particular application to drying 1-olefin polymers as obtained by displacing at least a part of the polymerization solvent by water in the recovery of such polymers from the polymerization diluent or solvent and is especially useful in drying high molecular weight 1-olefin polymers prepared by low temperature methods as described below.

It has been recently discovered that 1-olefins having a maximum of 8 carbon atoms per molecule and no branching nearer the double bond than the 4-position can be polymerized to solid and semi-solid polymers at low temperatures and pressures as compared with conventional processes for polymerizing these olefins. Such polymerization is generally carried out by first admixing and at least partially dissolving the olefins in a non-polymerizable solvent and carrying out the polymerization in the presence of a catalyst.

In the copending application of Hogen et al., filed March 26, 1956, and having Serial No. 573,877, now U.S. Patent 2,825,721, a process is disclosed for producing novel polymers of 1-olefins by carrying out the polymerization at a temperature in the range of 100 to 500° F. in the presence of 0.1 to 10 or more weight percent of chromium as chromium oxide, including a substantial proportion of hexavalent chromium associated with at least one porous oxide selected from the group consisting of silica, alumina, zirconia and thoria. A preferred catalyst is one comprising 0.1 to 10 weight percent chromium as the oxide on a silica-alumina support such as 90 percent silica-10 percent alumina. This catalyst is ordinarily a highly oxidized catalyst which has been activated by high-temperature treatment under non-reducing conditions and preferably with an oxidizing gas. Olefins, other than 1-olefins as described, are polymerized by the action of this catalyst but many of the resulting polymers are preponderantly normally liquid at least when polymerized under the described conditions. The polymerization is suitably carried out in the liquid phase such as in solution in a hydrocarbon solvent, especially a paraffin or cycloparaffin which is liquid under the polymerization conditions; however, vapor phase operation or mixed phase operation can be effected. Also, diolefins can be polymerized by the chromium oxide catalyst to produce solid polymers. As has been indicated, this invention is applicable to drying olefin polymers broadly and is particularly applicable to drying of polymers as prepared by the above preferred method. However, polymers as prepared by other catalyst systems can be dried by the method of this invention, e.g., polymers prepared by the organo-metal catalysts such as those disclosed in Belgian Patent 533,362, issued November 16, 1954, to Karl Ziegler.

These polymers of 1-olefins can be separated from the hydrocarbon diluent by vacuum flashing, steam stripping or preferably by first dispersing the solution into water, coagulating the polymer and then separating the solvent by steam stripping. This latter method is fully disclosed and claimed in copending application of R. G. Wallace, filed May 14, 1956, and having Serial No. 584,812, now abandoned. Regardless of the method employed, the polymer will still be wet with water and/or solvent and must be dried. This invention is directed to an improved method of drying such polymers.

One object of the present invention, therefore, is to provide an improved method of drying olefin polymers.

In one aspect, an object of this invention is to provide a novel combination of drying elements to readily dry 1-olefin polymers to less than about 0.05 weight percent volatile material.

Other objects, advantages and features of this invention will be obvious to those skilled in the art having been given this disclosure.

It is known that olefin polymers are readily dried to about 97 weight percent solids in conventional drying equipment, however, the removal of the remaining volatile matter is comparatively difficult taking as long or longer to remove. It is desirable that the recovered polymer should contain not more than about 0.05 weight percent volatile matter before being sent to the finishing steps.

According to this invention, volatile material is removed from solid particles of polymer by partially drying the material in solid state and subsequently heating the polymer to at least the softening temperature, masticating with the attendant removal of volatile material and extruding same essentially free of volatile material.

As has been indicated, the volatile material can be either water or solvent, but usually includes both. The first drying steps can be carried out in any conventional drying apparatus such as an apron dryer or steam tube, for example, a Link-Belt Roto-Louvre Dryer such as described on pages 824–826 of the third edition of Perry's Chemical Engineering Handbook, 1950, published by McGraw-Hill, New York, New York. The second drying step can be performed with any suitable apparatus provided with means for heating, masticating, venting and extruding. One suitable apparatus is fully described in U.S. Re. 23,948, issued February 15, 1955, to Lawrence J. Fuller.

As previously indicated, the polymeric materials to which this invention is particularly applicable are polymers of 1-olefins. Polymers of 1-olefins containing 2 to 8 carbon atoms and having no branching nearer the double bond than the 4-position have been found in recent years to have superior heat resistance and superior low temperature properties when polymerized at relatively low temperatures and pressures. The above-identified method of Hogan et al. is one such low temperature-low pressure method. As indicated above, it is preferable to carry out the polymerization in a hydrocarbon solvent and to separate the solvent from polymer by steam stripping. The resulting solid polymer is then separated from the bulk of the liquid by screening, decantation or other suitable liquid solid separation means. This invention has particular application in drying such recovered solids.

Examples of the preferred 1-olefins whose polymers can be dried by the method of this invention include ethylene, propylene, 1-butene, 1-pentene, 1-hexene, 1-octene, 4-methyl-1-pentene, 4-methyl-1-hexene, 4-ethyl-1-hexene, 6-methyl-1-heptene, 5-methyl-1-heptene and the like.

The solvents especially useful in polymerization of the 1-olefins are hydrocarbons and preferably paraffins including cycloparaffins. These diluents include paraffins and cycloparaffins having 3 to 12 carbon atoms per molecule. Any of the paraffins or cycloparaffins which are a solvent for the polymer at the temperature in the polymerization range are suitable. Any hydrocarbon which is relatively inert, non-deleterious, and liquid under the operating conditions of the process can be utilized. Diluents that have been used successfully in the polymerization reaction and are operable in this invention include propane, isobutane, normal pentane, isopentane, isooctane (2,2,4-trimethylpentane), cyclohexane and methylcyclohexane. Unsaturated aliphatic and cyclic hydrocarbons are, in general, not used in the polymerization reaction since they are likely to enter the polymerization reaction. However, any of these hydrocarbons can be removed from polymer by the method of this invention.

In the preferred operation of this invention, polymer wet with water and/or solvent is dried by conventional means at a temperature below the softening temperature and generally in the range of 180-255° F. to 95-98 percent solids, the then dried solids are passed to a second zone wherein the material is heated to at least the softening temperature and preferably to a temperature wherein the polymer is substantially in liquid phase and the polymer is masticated, volatiles vented off, and the polymer extruded. The temperature in this second step is at least the softening temperature and will generally be in the range of 300-500° F. The material is then cooled and generally chopped to particles of the desired size. By the use of this invention, polymer containing not more than 0.05 weight percent volatile matter can be readily obtained.

Of the polymers of 1-olefins which can be dried by the process of this invention, polyethylene as prepared by the method of Hogan et al. is of great commercial importance. Such polyethylene polymers are readily treated by the method of this invention, and for that reason, these polymers are the preferred polymers for this invention.

This invention will be further described in conjunction with the drawing, which is a block flow diagram of one polymerization and polymer recovery system incorporating the drying method of this invention.

Referring now to the drawing, solvent, olefin and catalyst, preferably at reaction temperatures are admitted to polymerization zone 1 via conduits 2, 3, and 4, respectively. It will be understood by those skilled in the art that one or more of the ingredients can be at a higher temperature and others at a lower temperature so that the resulting admixture is at the desired polymerization temperature or the entire mixture can be brought to operating conditions. In general, the catalyst will be suspended in at least a portion of the solvent. Also, olefin and solvent can be premixed if desired. At any rate, the polymerization reaction is exothermic and means are generally employed to remove heat of reaction. One convenient means for removing this reaction heat is by means of a coolant flowing through a heat exchange coil such as 5. The effluent from the polymerization zone 1 passes via conduit 6 to monomer removal zone 7 wherein unreacted monomers and low boiling polymers are removed and recycled to the polymerization zone via conduit 8. The effluent from this zone then passes via conduit 9 to catalyst removal zone 10 wherein solid catalyst such as used by the Hogan et al. method is removed by filtration or other suitable means. The catalyst is removed via conduit 11. The filtrate, i.e., polymer solution, passes via conduit 12 to concentration adjustment zone 13 wherein the polymer concentration in solvent is adjusted to obtain the proper concentration for precipitation e.g. 2 to 5 percent being preferred in the filtering step. Excess solvent is removed via conduit 15. Conduit 14 is provided to add solvent if desired. The polymer solution from zone 13 passes via conduit 16 to dispersion zone 17 wherein it is dispersed in 1 to 5 volumes of cool water from conduit 18 thereby precipitating polymer and displacing solvent. The resulting polymer-liquid slurry then passes via conduit 19 to steam stripping zone 20. The solution from the catalyst removal zone, or even from the monomer removal zone where low ash polymer is not required, can pass directly to the stripping zone or in any case, other solvent removal methods can be employed. In the steam stripping zone as shown, steam is admitted via conduit 21 and recycle water via conduit 22. This stripping zone is preferably provided with a stirrer 23 since the polymer will otherwise float on the water. Vapors are removed from the steam stripping zone via conduit 24 to condenser 25 and on to phase separation zone 26. Non-condensibles are taken overhead via conduit 27, solvent is removed via conduit 28 and sent to solvent recovery zone, not shown. Water is removed from phase separation zone 26 via conduit 29 and is recycled or dumped as desired. Polymer in a water slurry is removed from zone 20 via conduit 30 to liquid-solids separation zone 31 wherein the wet solid is separated from the liquid. This separation zone can comprise any suitable separation means and generally a screen is used. A shaker screen is used in my example. Liquid from separator 31 passes via conduit 32 to surge tank 33. Any excess water is removed via conduit 34. The necessity of removing or adding water will be dependent upon the net gain or loss of water from the steam stripping zone 20. The water from surge tank 33 is removed via conduit 35 and a portion recycled to stripping zone 20 via conduit 22 and a portion cooled by means of cooler 37 and recycled to dispersion zone 17 via conduit 18. Makeup water is supplied via conduit 36.

The damp polymer solids from liquid-solids separation zone 31 pass via conduit 38 to a dryer 39. Any conventional evaporative type dryer can be used. In the dryer shown, warm air or other gas enters via conduit 40, picks up moisture and passes via conduit 41 to separator 42 wherein most of the polymer picked up is separated out. The gases containing a very small percentage of fines pass overhead via conduit 43 to spray condenser 44 or other condensing means. In this spray condenser the gases are washed by a liquid spray thereby removing most of the condensibles. This spray collects as a liquid pool in the bottom of the condensing zone of condenser 44. Since some fines come overhead via conduit 43 in the gases and are also washed out in the condenser and since these fines would segregate from the liquid a stirrer 45 is provided to keep the polymer in suspension in the liquid. This liquid from the bottom of zone 44 passes via conduit 46 to phase separator wherein polymer fines and liquid are separated. The polymer is removed via conduit 48 and can be returned to the drying zone or discarded or otherwise treated as desired. Liquid from separator 47 is removed and a portion recycled as spray to spray condenser 44 and a portion removed from the system via conduit 50. Gases from spray condenser 44 pass overhead via conduit 51 to blower 52 and heater 53 and are recycled to dryer 39 via conduit 40.

The polymer from dryer 39 now dried to about 97 weight percent solids passes via conduit 54 to pneumatic conveyor 55 and is carried thereby to separator 56 wherein solids and carrier gas are separated. The gas passes overhead from separator 56 via conduit 57 and passes to blower 58 and thereafter returned to conveyor 55 to pick up additional polymer. Polymer from cyclone separator 42 passes via conduit 59 to conduit 54 and is mixed with polymer from dryer 39. The polymer from cyclone 56 is passed to vented extruder dryer 60 wherein the polymer is heated to a temperature at least as high as the softening point of the polymer, the polymer masticated and volatile matter eliminated. This volatile material is vented via conduit 61. The polymer is extruded and passes via conduit 62, to liquid cooler 63 and air cooler 68. The coolant, e.g., water, in cooler 63 is circulated via conduit 64 to pump 65 and cooler 66 and returned to cooler 63. Air enters air cooler 68 via conduit 69 and leaves via conduit 70. The polymer from air cooler 68 passes via conduit 71 to a suitable chopper 72 wherein the polymer is cut into particles of desired size. The chopped polymer passes via conduit 73 to screen 74. Fines from screen 74 are returned to the vented extruder via conduit 75 and the product removed via conduit 76.

Those skilled in the art will recognize that many modifications can be made and still obtain the advantages of this invention. Some such modifications have been suggested in the above description. The damp polymer can be obtained from any source and this invention is not limited to polymer obtained by the described method, however, this invention is particularly suitable to such polymer. The cyclone 42 can be bypassed so that the wet gases from dryer 39 pass directly to the condenser. Gases, other than air can be used as the drying gas or pneumatic conveyor gas. When the polymer is wet with solvent rather than water, some inert drying gas such as nitrogen or $CO_2$ would preferably be used since air and solvent would form an explosive material. Many such changes can be made. Valves, pumps, etc., can also be supplied by those skilled in the art as needed.

Specific embodiment

My invention will be further illustrated by the following specific embodiment.

Ethylene is polymerized in cyclohexane in the presence of about 2.5 percent chromium as the oxide on a 90/10 silica/alumina support at 285° F. and 450 p.s.i.g. The chromium oxide-silica-alumina catalyst is first activated by heating in dry air at 950° F. The effluent from the reactor is first passed to the monomer removal zone wherein unpolymerized ethylene is removed. The catalyst is then removed by filtration and the concentration is adjusted to about 4 percent polymer in solvent. This solution containing about 4 percent solids is admixed with water of about 100° F., thereby causing the polyethylene to coagulate and the resulting slurry is steam stripped to remove a large portion of the cyclohexane solvent. The wet polymer, about 70 percent solids, is removed from the stripping zone at 160° F. and fed to a Link-Belt Roto-Louvre Dryer. A drying air at 250° F. is passed to the dryer where it vaporizes water and solvent. The gases leave the dryer at 180° F. and contain some entrained polymer. These gases pass to a spray condenser of the type described in conjunction with the drawing and the condensibles and polymer removed therefrom. The gases are heated again to 250° F. and are returned to the dryer. After a residence time of 3 hours, the polymer, now 98 percent solids and at a temperature of 210° F. is passed by means of a pneumatic conveyor to a vented extruder of the type shown by the Fuller patent. The polymer is melted and worked in this extruder and finally extruded as ⅛ inch cylindrical strands containing about 0.05 weight percent volatile matter. The polymer leaves the extruder at 350–400° F. and is cooled and chopped.

I claim:

1. In the process of drying solid polymers prepared from aliphatic mono-1-olefin hydrocarbons wherein the major proportion of normally liquid volatile material is separated by conventional drying means, the improvement comprising heating the partially wet polymer to a temperature of at least the softening temperature of said polymer and below its decomposition temperature, simultaneously masticating the softened polymer and removing volatilized moisture therefrom to lower the moisture content to not more than 0.05 weight percent, thereafter extruding the dried polymer and recovering same.

2. In the process of drying solid polymer prepared from aliphatic mono-1-olefin hydrocarbons wherein said polymer is dried to a moisture content of 2 to 5 weight percent, the improvement comprising heating the polymer containing said 2 to 5 weight percent moisture to a temperature of at least the softening temperature of the polymer, simultaneously masticating the softened polymer and continuously withdrawing volatilized material therefrom so as to reduce the total moisture content to not more than 0.05 weight percent, thereafter extruding the dried polymer and recovering same essentially free of volatile material.

3. The improvement of claim 2 wherein the polymer is heated to a temperature wherein said polymer is largely in liquid phase.

4. A process for separating normally liquid volatile material from solid polymers of mono-1-olefins prepared from aliphatic mono-1-olefin hydrocarbons of not more than 12 carbon atoms and having no branching nearer the double bond than the 4-position by contacting said monoolefin with hexavalent chromium oxide catalyst and containing more than 5 weight percent volatiles, said process comprising heating said polymer to a temperature in the range 180°–225° F. until the moisture content of said polymer is reduced to an amount in the range 2 to 5 weight percent, heating the thus partially dried polymer to a temperature of at least the softening temperature of said polymer, simultaneously masticating the softened polymer and withdrawing volatilized material therefrom so as to reduce the total moisture content to not more than 0.05 weight percent, extruding the thus dried polymer, cooling same to below the solidification temperature and recovering essentially dry polymer.

5. In the process wherein an aliphatic mono-1-olefin hydrocarbon polymer is prepared by contacting the 1-olefin monomer of 2 to 12 carbon atoms and having no branching nearer the double bond than the 4 position with a hexavalent chromium oxide catalyst in the presence of a hydrocarbon diluent and recovering the polymer from said diluent by dispersing same in water and recovering the polymer from the major portion of water by phase separation means, the improvement of drying said polymer wet with more than 5 weight percent water comprising heating said wet polymer to a temperature in the range 180–255° F. thereby volatilizing water and removing same until the moisture content of said polymer is in the range 2 to 5 weight percent, simultaneously heating the thus partially dried polymer to a temperature in the range 300–500° F., masticating the polymer and withdrawing moisture so as to reduce the total moisture content to not more than 0.05 weight percent, thereafter cooling the polymer to below the solidification temperature and recovering said polymer.

6. The improvement of claim 5 wherein the polymer is polyethylene.

References Cited in the file of this patent

UNITED STATES PATENTS

| 2,401,754 | Green et al. | June 11, 1946 |
| 2,728,758 | Field et al. | Dec. 27, 1955 |
| 2,776,274 | Cairns | Jan. 1, 1957 |
| 2,825,721 | Hogan et al. | Mar. 4, 1958 |